(12) United States Patent
Chong et al.

(10) Patent No.: US 6,862,666 B2
(45) Date of Patent: Mar. 1, 2005

(54) HARDWARE ASSISTED LEASE-BASED ACCESS TO MEMORY

(75) Inventors: Fay Chong, Cupertino, CA (US); Nisha Talagala, Fremont, CA (US); Whay Sing Lee, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 137 days.

(21) Appl. No.: 10/147,729

(22) Filed: May 16, 2002

(65) Prior Publication Data

US 2003/0217241 A1 Nov. 20, 2003

(51) Int. Cl.[7] .............................................. G06F 12/00
(52) U.S. Cl. ........................... 711/152; 711/163; 707/8; 710/200; 718/104
(58) Field of Search ................................ 711/152, 163, 711/155; 707/8; 709/208; 710/200; 717/140; 718/104

(56) References Cited

U.S. PATENT DOCUMENTS

| | | | | |
|---|---|---|---|---|
| 5,095,421 A | * | 3/1992 | Freund | 718/101 |
| 5,392,433 A | * | 2/1995 | Hammersley et al. | 710/200 |
| 5,579,505 A | * | 11/1996 | Ohkami | 711/155 |
| 5,692,178 A | * | 11/1997 | Shaughnessy | 707/8 |
| 6,381,738 B1 | * | 4/2002 | Choi et al. | 717/140 |
| 6,401,110 B1 | * | 6/2002 | Freitas et al. | 718/104 |
| 6,493,746 B1 | * | 12/2002 | Enjou | 709/208 |
| 6,499,031 B1 | * | 12/2002 | Hopmann et al. | 707/8 |

* cited by examiner

Primary Examiner—Nasser Moazzami
(74) Attorney, Agent, or Firm—Robert C. Kowert; Meyertons, Hood, Kivlin, Kowert & Goetzel, P.C.

(57) ABSTRACT

A memory system is disclosed in which hardware assisted leases are utilized to control access to shared data resources among data users. The lease is a type of lock on content in the memory system that automatically expires after a preset period of time. The lease enables the lease owner exclusive use of the associated content in the memory system. Furthermore, the memory system has a memory access mechanism that is separate from the data users. The memory access mechanism includes hardware components to enforce lease-based access to the memory system. Since the lease expires rather than being permanently granted, no CPU or software thread is able to monopolize a lease forever. Moreover, since the lease-base access is hardware-assisted, faulty CPUs or software are prevented from unauthorized access to leased (or locked) content in which another CPU or software already holds a lease.

31 Claims, 8 Drawing Sheets

HARDWARE ASSISTED LEASE-BASED ACCESS TO MEMORY

BACKGROUND OF THE INVENTION

1. Field of the Invention

Embodiments of the present invention generally relate to memory systems. More particularly, embodiments of the present invention relate to the field of controlling access to the content of a memory.

2. Related Art

The growing trend towards networked computers, computers having multiple CPUs (central processing unit), and multi-threaded software poses a number of challenges for memory systems. In particular, the memory systems need to respond to access requests (e.g., to read data, to write data, etc.) from various data users (e.g., computer1, computer2, CPU1, CPU2, software1, software2, etc.) for shared resources while maintaining coherency so that the multiple data users have a similar view of the content in the memory system. Several approaches have been implemented.

In one case, when implementing concurrent multi-threaded software, mutually exclusive access to certain data structures in the memory system is often needed in order to guarantee coherence and to avoid corrupting the data structures. Such mutual exclusion is traditionally implemented using semaphores, which are software flags that a thread may set to indicate that it needs exclusive access to the associated data structure. Other threads are expected to properly inspect and honor the semaphore (i.e., not try to access the data structure when the flag is already set.)

This works well when the software is behaved, but problems arise when the software has design defects or is not operating properly. If the software has design defects, one thread may end up monopolizing a particular semaphore forever, preventing others from accessing the associated data structure forever. Moreover, if the software has design defects or undetected bugs (or operates in a faulty manner), a thread may choose to not honor the semaphore and to proceed to access a data structure whose flag is already set by another thread. This may lead to data coherency problems.

Similarly, in an architecture having multiple CPUs or computers (each having one or more CPUs), there is a need for mutually exclusive access to particular data of the content in the memory system. Such mutual exclusion is generally implemented using a lock process. The lock process enables a CPU to obtain a lock on the particular data in the memory system so as to prevent other CPUs from having access to the particular data until the lock is released by the CPU holding it. Typically, any other CPU that needs to access the particular data waits until the lock is released or communicates with the CPU holding the lock to request the release of the lock.

In this case, the lock process is suitable if the CPUs are functioning properly. Generally, the memory lock process fails to prevent a misbehaving CPU from accessing content of a memory system due to a design defect or undetected bugs (or operates in a faulty manner) or a hardware malfunction in the CPU. Moreover, the lock process does not prevent a CPU from monopolizing a lock to the detriment of other CPUs.

In sum, these approaches are less than satisfactory in many instances because broken/overloaded CPUs or defective software are able to corrupt content (in the memory system) belonging to another CPU or software through a lock or a semaphore and also to monopolize content (in the memory system) forever after securing a lock or a semaphore, complicating error recovery.

SUMMARY OF THE INVENTION

A memory system is disclosed in which hardware assisted leases are utilized to control access to shared data resources among data users. The lease is a type of lock on content in the memory system that automatically expires after a preset period of time. The lease enables the lease owner exclusive use of the associated content in the memory system. Furthermore, the memory system has a memory access mechanism that is separate from the data users. The memory access mechanism includes hardware components to enforce lease-based access to the memory system. Since the lease expires rather than being permanently granted, no CPU or software thread is able to monopolize a lease forever. Moreover, since the lease-base access is hardware-assisted, faulty CPUs or software are prevented from unauthorized access to leased (or locked) content in which another CPU or software already holds a lease.

In an embodiment, the memory of the memory system includes leasable memory blocks. Moreover, the memory system includes a lease table which includes the leases, whereas each lease corresponds to a leasable memory block. In one embodiment, there are two types of memory in the memory system. The first type is the leasable data memory where data is stored and retrieved. The other type is the lease table which stores the information necessary to maintain the lease.

In particular, each lease includes a plurality of lease information. The lease information may include a lease owner identifier, lease expiration data, a lease status, and a pointer corresponding to a leasable memory block. The lease status may be one of a leased state, an unleased state, and a lease expired state. In addition, the lease status determines whether a lease can be acquired by a data user (e.g., CPU, software, etc.) wanting exclusive use of the content of the leasable memory block. Moreover, the lease information determines which data user is authorized to access the associated leasable memory block for a preset period of time.

In practice, the memory access mechanism controls and grants access to the content of the leasable memory blocks based on the lease information in the lease table. Since the address of each leasable memory block is included in the corresponding lease of the lease table, an unauthorized data user cannot access the leasable memory block without first securing the corresponding lease which would then provide the address or path to the leasable memory block.

Exemplary lease operations include lease_acquire, lease_release, lease_read, lease_write, and lease_inquire. These operations facilitate the lease-base access to memory.

These and other advantages of the present invention will no doubt become apparent to those of ordinary skill in the art after having read the following detailed description of the preferred embodiments, which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Leases are utilized in a memory system to control access so as to maintain data resource coherency among multiple applications/processors. Since the lease expires rather than being permanently granted, no CPU or software thread is able to monopolize a lease forever. Moreover, since the lease-base access is hardware-assisted, faulty CPUs or software are prevented from unauthorized access to content in which another CPU or software already holds a lease.

Figure 1:
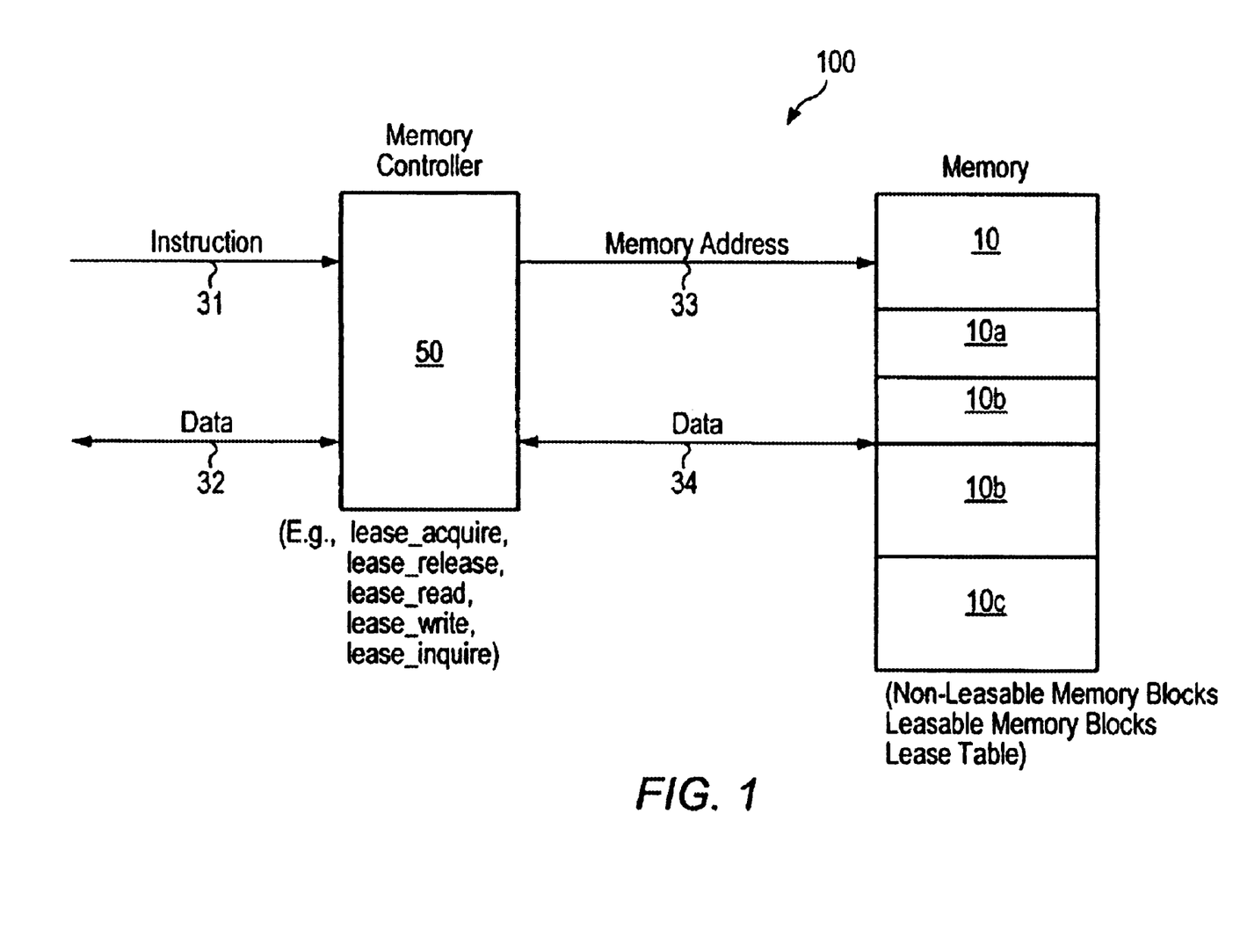
FIG. 1 illustrates an exemplary memory system in accordance with an embodiment of the present invention.

FIG. 1 illustrates an exemplary memory system 100 in accordance with an embodiment of the present invention. The memory system 100 includes a memory access mechanism 50 and a memory 10 for storing a plurality of shared content (e.g., data, pointers, resources, etc.). In particular, the memory system 100 utilizes leases to control access to the content in the memory 10. The lease is a type of lock on content in the memory 10 that automatically expires after a preset period of time. The lease enables the current lease owner with exclusive use of the associated content in the memory 10 until the lease expires.

In an embodiment, the memory 10 includes a plurality of leasable memory blocks 10b. Moreover, the memory 10 may include non-leasable memory blocks 10a. In addition, a lease table 10c of the memory system 100 may be stored in the memory 10, whereas the lease table 10c includes a plurality of leases. It should be understood that the lease table can be stored in the memory access mechanism 50 or in any other location.

Each lease of the lease table 10c corresponds to a leasable memory block 10b of the memory 10. Each lease includes a plurality of lease information. The lease enables exclusive use of the content in the corresponding leasable memory block of the memory 10 by a data user. The data user can be a CPU, software, a CPU-executing process, a computer, a device, or any other component needing to write or to read content in the memory 10. Access to a leasable memory block 10b is dependent on the lease information of the lease. In addition, the non-leasable memory blocks 10a do not have a corresponding lease in the lease table 10c. For example, the non-leasable memory blocks 10a may store content that is inaccessible to a data user, may store content that does not change, or may store content that does not require exclusive use by a data user.

Importantly, the memory access mechanism 50 includes hardware components to enforce lease-based access to the content of the memory 10. In an embodiment, the memory access mechanism 50 is a memory controller 50. The memory controller 50 controls and grants access to the content of the leasable memory blocks based on the lease information in the lease table. The lease information determines whether a lease can be acquired by a data user requesting or needing exclusive use of the content of the corresponding leasable memory block for a preset period of time. Moreover, the lease information determines which data user is authorized to access the corresponding leasable memory block for a preset period of time.

In an embodiment, the lease information of each lease includes a pointer to a corresponding leasable memory block. For example, the pointer may be a buffer pointer. Moreover, the pointer may be an address+length pair. Since the address of each leasable memory block is included in the corresponding lease of the lease table 10c, an unauthorized data user cannot access the leasable memory block 10b without first securing the corresponding lease which would then provide the address or path to the leasable memory block.

In practice, a data user provides an appropriate instruction or command via connection 31 to the memory controller 50 to access the content of the memory 10. Examples of the commands include a lease_acquire command, a lease_release command, a lease_read command, a lease_write command, and a lease_inquire command. The lease_acquire command enables the data user to attempt to become the owner of a lease ("lease holder") which corresponds to a leasable memory block so that the data user can have exclusive use of the content in the corresponding leasable memory block of the memory 10. The lease_release command enables the data user that is the owner of a lease that has not expired to release ownership of the lease so that any other data user can attempt to become owner of the lease. The lease_inquire command enables the data user to obtain lease information of a lease which corresponds to a leasable memory block so that the data user can determine the status of the lease (e.g., whether the lease has an owner, when the lease expires, etc.).

The lease_read command enables the data user that is the owner of a lease to read the content of the corresponding leasable memory block of the memory 10. In particular, the memory controller 50 verifies that the data user is authorized to read the content of the corresponding leasable memory block by using the lease information of the corresponding lease. If the data user is authorized to read the content of the corresponding leasable memory block, the memory controller 50 obtains the memory address of the corresponding leasable memory block from the lease information of the corresponding lease and supplies the memory address via the connection 33 to the memory 10. The memory 10 provides the content of the corresponding leasable memory block to the memory controller via connection 34. Moreover, the memory controller 50 provides the content of the corresponding leasable memory block to the data user via connection 32.

The lease_write command enables the data user that is the owner of a lease to write content to the corresponding leasable memory block of the memory 10. The data user supplies the content to be written to the corresponding leasable memory block of the memory 10 to the memory controller 50 via connection 32. In particular, the memory controller 50 verifies that the data user is authorized to write content to the corresponding leasable memory block by using the lease information of the corresponding lease. If the data user is authorized to write content to the corresponding leasable memory block, the memory controller 50 obtains the memory address of the corresponding leasable memory block from the lease information of the corresponding lease and supplies the memory address via the connection 33 to the memory 10. The memory controller 50 writes the content to the corresponding leasable memory block of the memory 10 via connection 34.

Figure 2:
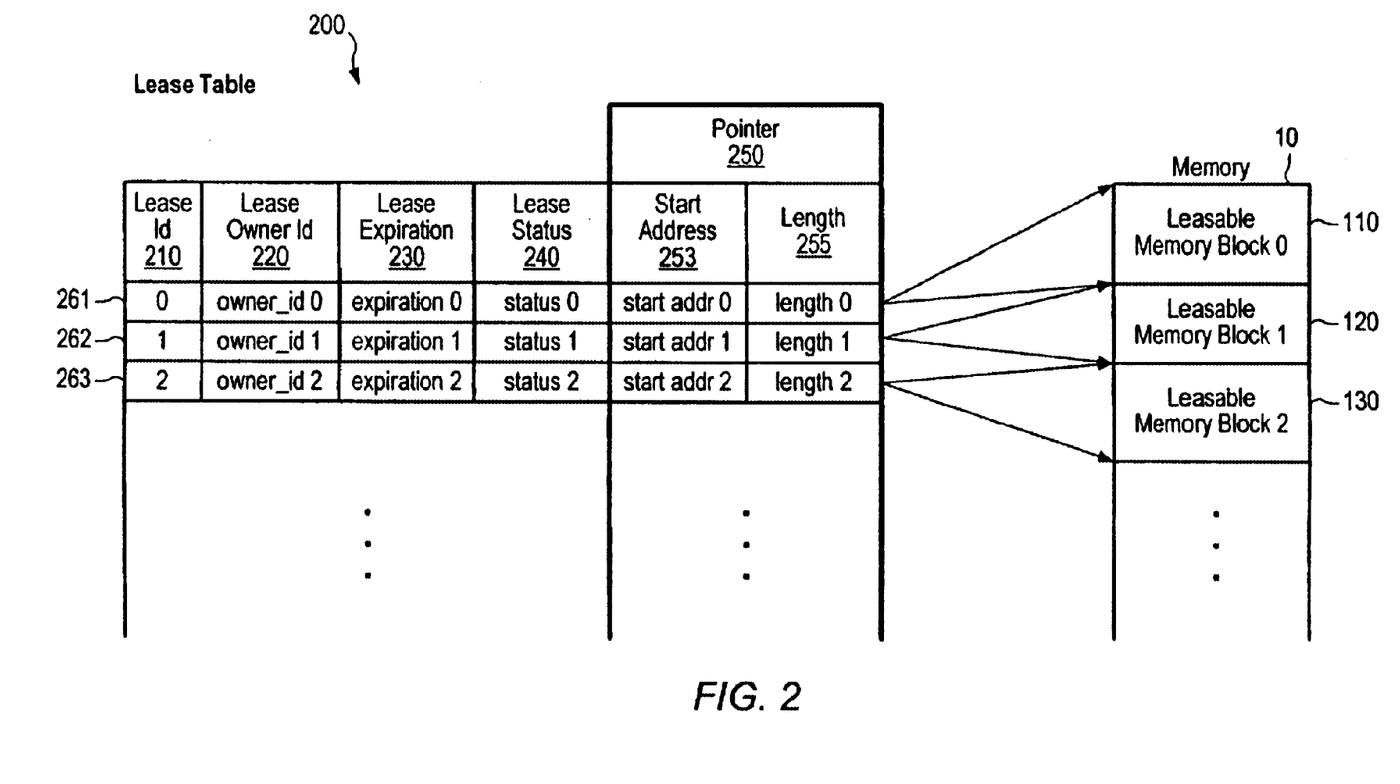
FIG. 2 illustrates an exemplary lease table and a memory in accordance with an embodiment of the present invention.

FIG. 2 illustrates a diagram format of a lease table 200 and a memory 10 in accordance with an embodiment of the present invention. As illustrated in FIG. 2, the lease table 200 may include a plurality of rows 261–263, whereas each row 261–263 represents a distinct lease 261–263. Each lease 261–263 of the lease table 200 corresponds to a leasable memory block 110–130 of the memory 10. Each lease 261–263 includes a plurality of lease information. The memory controller 50 sets and maintains the lease information. The lease enables exclusive use of the content in the corresponding leasable memory block of the memory 10 by a data user. The lease information may include a lease identifier 210, a lease owner identifier 220, lease expiration data 230, a lease status 240, and a pointer 250 to a corresponding leasable memory block 110–130. Since each lease is exclusive, the lease owner identifier 220 represents the identifier (e.g., CPU identification) of the data user that has exclusive use of the content of the corresponding leasable memory block of the memory 10. Ideally, the identifier should not be susceptible to manipulation by the data user. Once the lease becomes owned, other data users are prevented from acquiring it while the lease remains active, e.g., unexpired.

The lease expiration data 230 represents a preset period of time. Each lease 261–263 expires (e.g., ending authorized access) after the preset period of time elapses, allowing another data user to become the owner of the lease. The length of the preset period of time should be sufficient to allow the data user to accomplish its task, but should not be so long that error recovery is hindered. In practice, the lease expiration data 230 may be set when a data user successfully becomes the owner of a lease by using the lease_acquire command discussed earlier. Although the data user may suggest a value for the lease expiration data 230, the memory controller 50 (FIG. 1) sets the lease expiration data 230. Since the lease expires rather than being permanent, no data user is able to monopolize a lease forever. Moreover, error recovery can be expedited.

The lease status 240 may be one of the following: a leased state; an unleased state; and a lease expired state. The access privileges of a data user to a leasable memory block is dependent on the lease status 240 of the corresponding lease. If the lease status 240 is a leased state, the corresponding lease is currently owned by a data user that has an identifier that matches the lease owner identifier 220. If the lease status 240 is an unleased state, the corresponding lease is not currently owned by any data user. If the lease status 240 is a lease expired state, the corresponding lease is no longer owned (e.g., has expired) by a data user that has an identifier that matches the lease owner identifier 220 since the data user has not released the corresponding lease before the lease expiration data 230 elapses.

The pointer 250 includes a start address 253 and a length 255. As shown in FIG. 2, the lease 261 corresponds to the leasable memory block0 110. The lease 262 corresponds to the leasable memory block1 120. The lease 263 corresponds to the leasable memory block2 130. As depicted in FIG. 2, each lease 261–263 controls an address to a corresponding leasable memory block. Since the memory controller 50 (FIG. 1) enforces the lease-based access using the lease table 200, a faulty data user is prevented from unauthorized access to content of a leasable memory block in which another data user already holds the corresponding lease. Thus, the memory controller 50 (FIG. 1) insures that no data user can perform unauthorized accesses to the memory 10, avoiding corrupting the content of the memory 10. In effect, a data user has to communicate with the memory controller 50 (FIG. 1) to get access to the memory 10, but that access is controlled by the memory controller 50 (FIG. 1) using the lease table 200.

In an embodiment, the lease table 200 is static. Upon start-up, the lease table 200 is initialized. The initialization includes setting the number of leases that correspond to the memory 10, setting the size (e.g., 2 KB, 4 KB, etc.) of the leasable memory blocks, and setting the location of the leasable memory blocks. Alternatively, the lease table 200 may be dynamic. Thus, the number of leases, the size of the leasable memory blocks, and the location of the leasable memory blocks are dynamic.

Figure 3:
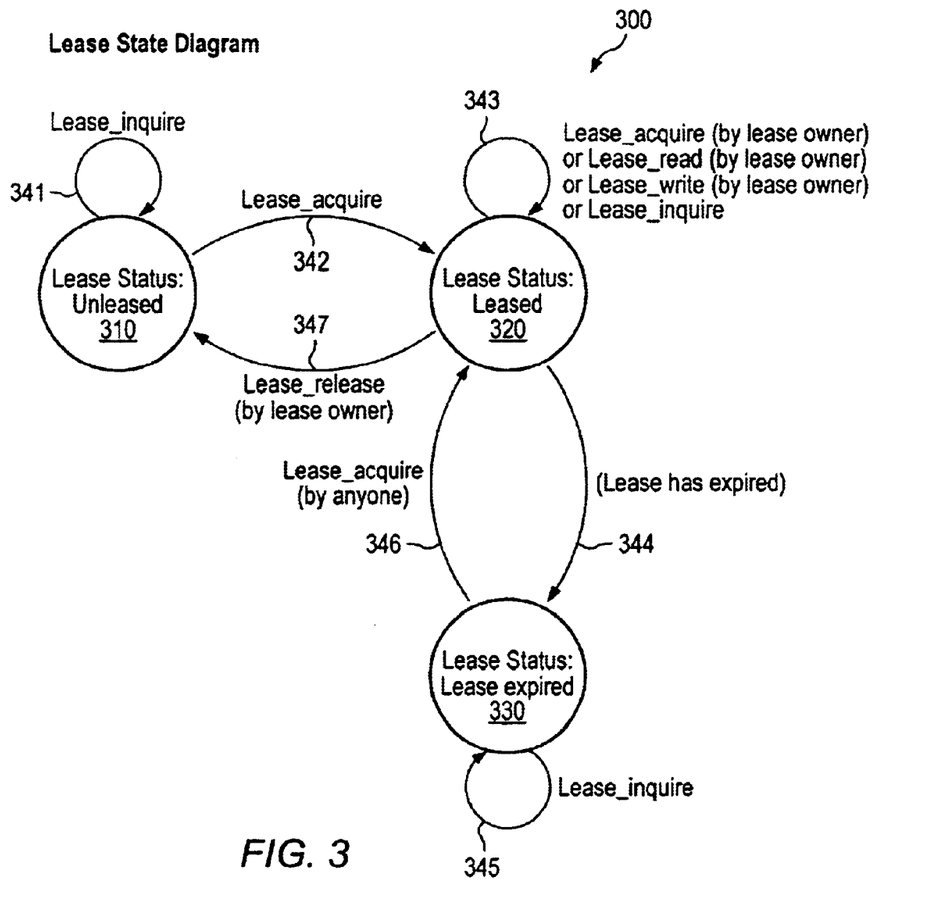
FIG. 3 illustrates a lease state diagram in accordance with an embodiment of the present invention.

FIG. 3 illustrates a lease state diagram 300 in accordance with an embodiment of the present invention. As illustrated in FIG. 3, the lease status of a lease may be one of an unleased state 310, a leased state 320, and a lease expired state 330.

If the lease status 240 (FIG. 2) of a particular lease is an unleased state 310, any data user can perform a lease_inquire 341 command with the memory controller 50 (FIG. 1) to obtain lease information of the particular lease so that the data user can determine the status of the particular lease (e.g., whether the lease has an owner, when the lease expires, etc.). Moreover, if the lease status 240 (FIG. 2) of a particular lease is an unleased state 310, any data user can perform a lease_acquire 342 command with the memory controller 50 (FIG. 1) to become owner of the particular lease, allowing the data user exclusive use of the content of the corresponding leasable memory block. Furthermore, the memory controller 50 (FIG. 1) sets the lease status 240 to a leased state 320.

If the lease status 240 (FIG. 2) of a particular lease is a leased state 320 and the particular lease has not expired, the data user that has an identifier that matches the lease owner identifier 220 (FIG. 2) of the particular lease can perform a lease_read 343 command with the memory controller 50 (FIG. 1) to read the content of the corresponding leasable memory block, can perform a lease_write 343 command with the memory controller 50 (FIG. 1) to write the content to the corresponding leasable memory block, or can perform a lease_acquire 343 command with the memory controller 50 (FIG. 1) to extend/renew the lease expiration 230 (FIG. 2) of the particular lease. Moreover, if the lease status 240 (FIG. 2) of a particular lease is a leased state 320, any data user can perform a lease_inquire 343 command with the memory controller 50 (FIG. 1) to obtain lease information of the particular lease so that the data user can determine the status of the particular lease (e.g., whether the lease has an owner, when the lease expires, etc.).

In addition, if the lease status 240 (FIG. 2) of a particular lease is a leased state 320 and the particular lease has not expired, the data user that has an identifier that matches the lease owner identifier of the particular lease can perform a lease_release 347 command with the memory controller 50 (FIG. 1) to voluntarily relinquish ownership of the lease so that any other data user can attempt to become owner of the particular lease to have exclusive use of the content of the corresponding leasable memory block. Furthermore, the memory controller 50 (FIG. 1) sets the lease status 240 to an unleased state 310.

If the lease status 240 (FIG. 2) of a particular lease is a leased state 320 and the particular lease expires because the lease expiration data 230 (FIG. 2) elapses, the memory controller 50 (FIG. 1) sets the lease status 240 to a lease expired state 330, as indicated by the arrow 344. Thus, the current lease owner of the particular lease involuntarily loses permission to access the content of the corresponding leasable memory block. This case could be caused by an overloaded or malfunctioning data user. Thus, the memory controller 50 (FIG. 1) may initiate an error detection notification procedure to notify some component (e.g., a CPU).

If the lease status 240 (FIG. 2) of a particular lease is a lease expired state 330, any data user can perform a lease_inquire 341 command with the memory controller 50 (FIG. 1) to obtain lease information of the particular lease so that the data user can determine the status of the particular lease (e.g., whether the lease has an owner, when the lease expires, etc.). Moreover, if the lease status 240 (FIG. 2) of a particular lease is a lease expired state 330, any data user can perform a lease_acquire 346 command with the memory controller 50 (FIG. 1) to become owner of the particular lease, allowing the data user exclusive use of the content of the corresponding leasable memory block. Furthermore, the memory controller 50 (FIG. 1) sets the lease status 240 to a leased state 320.

Figure 4:
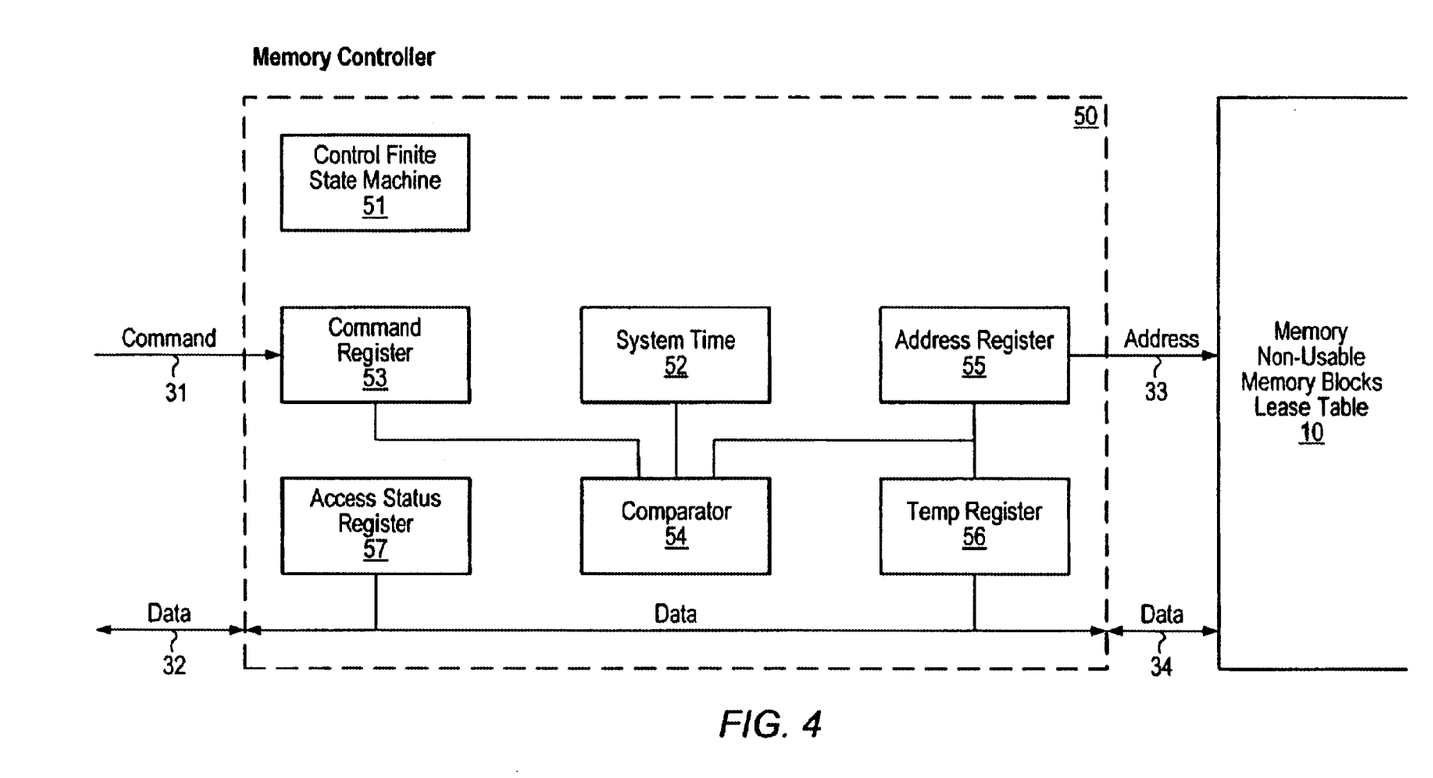
FIG. 4 illustrates an exemplary memory controller in accordance with an embodiment of the present invention.

FIG. 4 illustrates an exemplary memory controller 50 in accordance with an embodiment of the present invention. As illustrated in FIG. 4, the memory controller 50 includes a control finite state machine 51, a command register 53, a system time clock 52, a comparator 54, an address register 55, a temp register 56, and an access status register 57. The memory controller 50 controls and grants access to the content of the leasable memory blocks based on the lease information in the lease table. It should be understood that the memory controller 50 can have other configurations.

Figure 10:
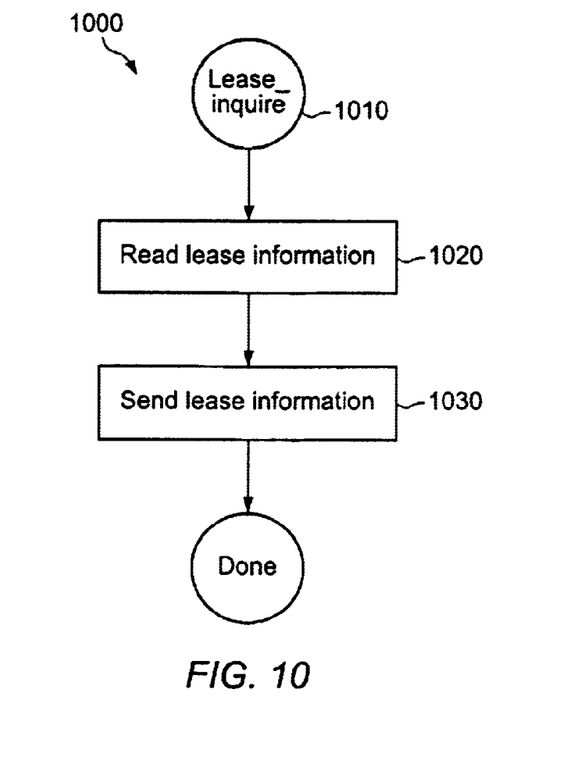
FIG. 10 illustrates a flow chart for a lease_inquire command in accordance with an embodiment of the present invention.

The control finite state machine 51 controls the operation of the memory controller 50. In practice, a data user provides a particular command (e.g., a lease_acquire command, a lease_release command, a lease_read command, a lease_write command, a lease_inquire command, etc.) to the memory controller 50 via connection 31. The particular command is stored in the command register 53. Depending on the particular command received from the data user, the control finite state machine 51 may initiate a number of tasks. In particular, the lease information of a particular lease may be retrieved from the memory 10 and stored in the temp register 56. The control finite state machine 51 proceeds based on the lease status stored in the temp register 56. Additionally, information from the command register 53 (e.g., data user identifier) and from the system time clock 52 may be compared in the comparator 54 with the lease information (e.g., lease owner identifier, lease expiration data) stored in the temp register 56. Moreover, the control finite state machine 51 sets the access status register 57 to an appropriate state to indicate to the data user whether the memory access was successful or unsuccessful.

Figure 4A:
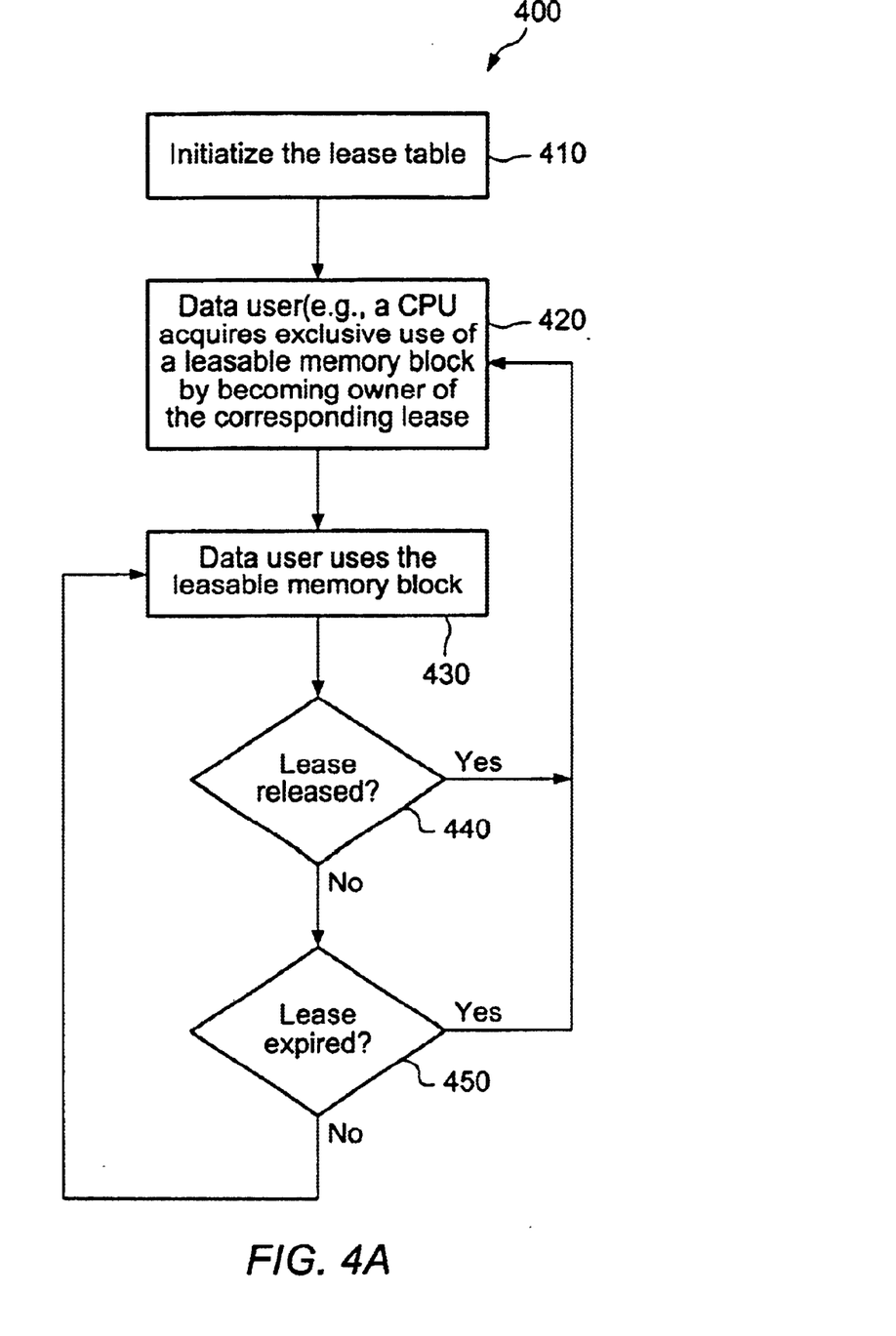
FIG. 4A illustrates a flow chart for leased-based access to memory in accordance with an embodiment of the present invention.

FIG. 4A illustrates a flow chart 400 of steps performed for leased-based access to memory in accordance with an embodiment of the present invention. At Block 410, the lease table 200 (FIG. 2) is initialized. Initialization may include setting the number of leases that correspond to the memory 10 (FIG. 1), setting the size of the leasable memory blocks 10b (FIG. 1), and setting the location of the leasable memory blocks 10b (FIG. 1). Moreover, at Block 420, a data user acquires exclusive use of a leasable memory block by becoming owner of the corresponding lease of the lease table 200. In particular, the data user provides a lease_acquire command to the memory controller 50 (FIG. 4). If the lease_acquire command is successful, the memory controller 50 (FIG. 4) grants the data user exclusive use of the leasable memory block by making the data user the owner of the corresponding lease.

Furthermore, at Block 430, the data user uses the leasable memory block. The data user provides the lease_read command to the memory controller 50 (FIG. 4) to read the content of the leasable memory block. After verifying the data user's access privileges in the lease information of the corresponding lease, the memory controller 50 (FIG. 4) retrieves the content of the leasable memory block. The data user provides content (for writing to the leasable memory block) and the lease_write command to the memory controller 50 (FIG. 4) so that to write the content to the leasable memory block. After verifying the data user's access privileges in the lease information of the corresponding lease, the memory controller 50 (FIG. 4) writes the content to the leasable memory block.

At Block 440, the data user may voluntarily relinquish the lease of the leasable memory block. The data user provides the lease_release command to the memory controller 50 (FIG. 4) to voluntarily relinquish the lease. If the data user does voluntarily relinquish the release, any other data user may acquire the lease, at Block 420.

Moreover, at Block 450, the memory controller 50 (FIG. 4) determines whether the lease has expired. If the lease is expired, the memory controller 50 (FIG. 4) updates the lease information of the lease to reflect the lease expired state. Then, the data user involuntarily loses access privileges to the leasable memory block. Hence, any other data user may acquire the lease, at Block 420. Otherwise, if the lease is not expired, the data user retains its access privileges to the leasable memory block, at Block 430.

Figure 5:
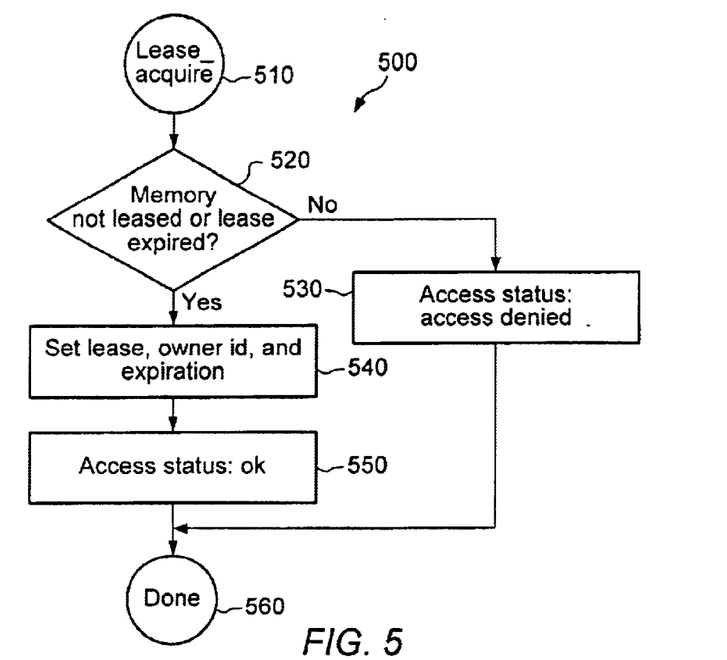
FIG. 5 illustrates a flow chart for a lease_acquire command in accordance with an embodiment of the present invention.

FIG. 5 illustrates a flow chart 500 of steps performed for a lease_acquire command in accordance with an embodiment of the present invention. At Block 510, the memory controller 50 (FIG. 4) receives a lease_acquire command from a data user. The data user indicates the particular leasable memory block whose corresponding lease the data user wants to own (or acquire). Alternatively, the data user may provide the lease identifier 210 (FIG. 2) corresponding to lease of the particular leasable memory block. The memory controller 50 (FIG. 4) retrieves the lease information (e.g., a lease identifier 210 (FIG. 2), a lease owner identifier 220 (FIG. 2), lease expiration data 230 (FIG. 2), a lease status 240 (FIG. 2), a pointer 250 (FIG. 2)) of the lease corresponding to the particular leasable memory block.

At Block 520, the memory controller 50 (FIG. 4) determines whether the lease status 240 (FIG. 2) is an unleased state or a lease expired state. The unleased state indicates that the lease of the particular leasable memory block is not currently owned by any other data user. The lease expired state indicates that the current owner of the lease of the particular leasable memory block has lost permission to access the particular memory block. If the lease status 240 (FIG. 2) is not an unleased state or a lease expired state, at Block 530 the memory controller 50 (FIG. 4) sets the access status register 57 (FIG. 4) to an access denied state to indicate to the data user that access to the particular leasable memory block was unsuccessful.

If the lease status 240 (FIG. 2) is an unleased state or a lease expired state, at Block 540 the memory controller 50 (FIG. 4) sets the lease status, the lease owner identifier, and the lease expiration data of the lease of the particular leasable memory block. Moreover, the memory controller 50 (FIG. 4) stores the updated lease information in the lease table. At Block 550, the memory controller 50 (FIG. 4) sets the access status register 57 (FIG. 4) to an access ok state to indicate to the data user that access to the particular leasable memory block was successful. At Block 560, the memory controller 50 (FIG. 4) sends the information of the access status register 57 (FIG. 4) to the data user.

Figure 6:
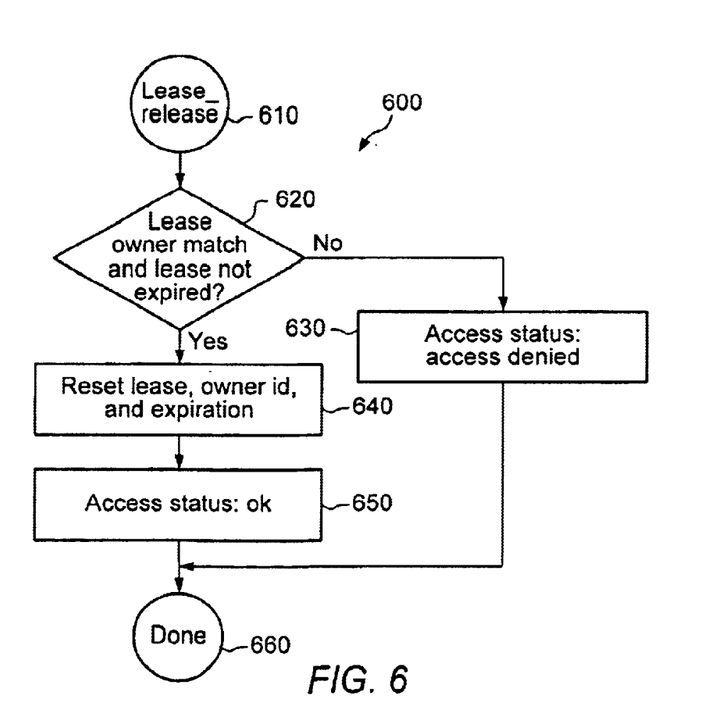
FIG. 6 illustrates a flow chart for a lease_release command in accordance with an embodiment of the present invention.

FIG. 6 illustrates a flow chart 600 of steps performed for a lease_release command in accordance with an embodiment of the present invention. At Block 610, the memory controller 50 (FIG. 4) receives a lease_release command from a data user. The data user indicates the particular leasable memory block whose corresponding lease the data user wants to relinquish (or release). Alternatively, the data user may provide the lease identifier 210 (FIG. 2) corresponding to lease of the particular leasable memory block. The memory controller 50 (FIG. 4) retrieves the lease information (e.g., a lease identifier 210 (FIG. 2), a lease owner identifier 220 (FIG. 2), lease expiration data 230 (FIG. 2), a lease status 240 (FIG. 2), a pointer 250 (FIG. 2)) of the lease corresponding to the particular leasable memory block.

At Block 620, the memory controller 50 (FIG. 4) determines whether the lease status 240 (FIG. 2) is a leased state, whether the lease owner identifier matches the identifier of the data user, and whether the lease has expired (i.e., the lease expiration data has elapsed). If the lease status 240 (FIG. 2) is not a leased state, the identifier match is unsuccessful, or the lease has expired, at Block 630 the memory controller 50 (FIG. 4) sets the access status register 57 (FIG. 4) to an access denied state to indicate to the data user that access to the particular leasable memory block was unsuccessful.

If the lease status 240 (FIG. 2) is a leased state, the identifier match is successful, and the lease has not expired, at Block 640 the memory controller 50 (FIG. 4) resets the lease status, the lease owner identifier, and the lease expiration data of the lease of the particular leasable memory block. Moreover, the memory controller 50 (FIG. 4) stores the updated lease information in the lease table. At Block 650, the memory controller 50 (FIG. 4) sets the access status register 57 (FIG. 4) to an access ok state to indicate to the data user that access to the particular leasable memory block was successful. At Block 660, the memory controller 50 (FIG. 4) sends the information of the access status register 57 (FIG. 4) to the data user.

Figure 7:
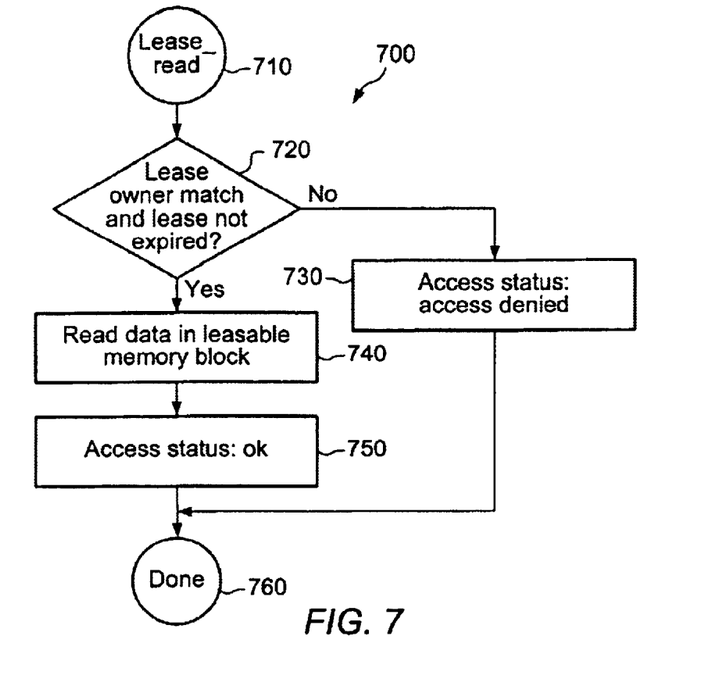
FIG. 7 illustrates a flow chart for a lease_read command in accordance with an embodiment of the present invention.

FIG. 7 illustrates a flow chart 700 of steps performed for a lease_read command in accordance with an embodiment of the present invention. At Block 710, the memory controller 50 (FIG. 4) receives a lease_read command from a data user. The data user indicates the particular leasable memory block whose corresponding content the data user wants to read. Alternatively, the data user may provide the lease identifier 210 (FIG. 2) corresponding to lease of the particular leasable memory block. The memory controller 50 (FIG. 4) retrieves the lease information (e.g., a lease identifier 210 (FIG. 2), a lease owner identifier 220 (FIG. 2), lease expiration data 230 (FIG. 2), a lease status 240 (FIG. 2), a pointer 250 (FIG. 2)) of the lease corresponding to the particular leasable memory block.

At Block 720, the memory controller 50 (FIG. 4) determines whether the lease status 240 (FIG. 2) is a leased state, whether the lease owner identifier matches the identifier of the data user, and whether the lease has expired (e.g., the lease expiration data has elapsed). If the lease status 240 (FIG. 2) is not a leased state, the identifier match is unsuccessful, or the lease has expired, at Block 730 the memory controller 50 (FIG. 4) sets the access status register 57 (FIG. 4) to an access denied state to indicate to the data user that access to the particular leasable memory block was unsuccessful.

If the lease status 240 (FIG. 2) is a leased state, the identifier match is successful, and the lease has not expired, at Block 740 the memory controller 50 (FIG. 4) reads the content of the particular leasable memory block. At Block 750, the memory controller 50 (FIG. 4) sets the access status register 57 (FIG. 4) to an access ok state to indicate to the data user that access to the particular leasable memory block was successful. At Block 760, the memory controller 50 (FIG. 4) sends the information of the access status register 57 (FIG. 4) to the data user. Moreover, the memory controller 50 (FIG. 4) sends the content of the particular leasable memory block to the data user if the access to the particular leasable memory block was successful.

Figure 8:
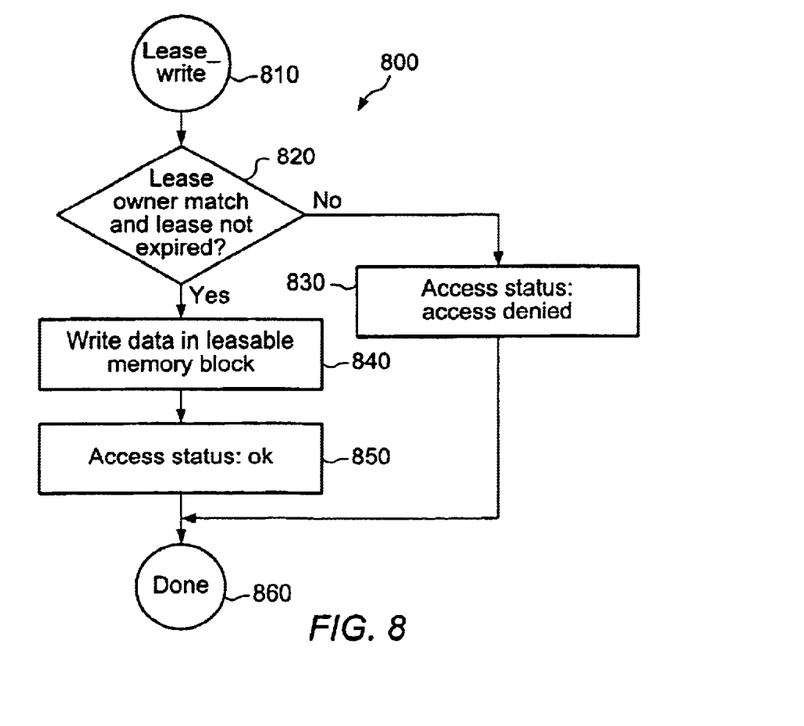
FIG. 8 illustrates a flow chart for a lease_write command in accordance with an embodiment of the present invention.

FIG. 8 illustrates a flow chart of steps involved for a lease_write command in accordance with an embodiment of the present invention. At Block 810, the memory controller 50 (FIG. 4) receives a lease_write command and content (to be written) from a data user. The data user indicates the particular leasable memory block where the data user wants to write content. Alternatively, the data user may provide the lease identifier 210 (FIG. 2) corresponding to lease of the particular leasable memory block. The memory controller 50 (FIG. 4) retrieves the lease information (e.g., a lease identifier 210 (FIG. 2), a lease owner identifier 220 (FIG. 2), lease expiration data 230 (FIG. 2), a lease status 240 (FIG. 2), a pointer 250 (FIG. 2)) of the lease corresponding to the particular leasable memory block.

At Block 820, the memory controller 50 (FIG. 4) determines whether the lease status 240 (FIG. 2) is a leased state, whether the lease owner identifier matches the identifier of the data user, and whether the lease has expired (i.e., the lease expiration data has elapsed). If the lease status 240 (FIG. 2) is not a leased state, the identifier match is unsuccessful, or the lease has expired, at Block 730 the memory controller 50 (FIG. 4) sets the access status register 57 (FIG. 4) to an access denied state to indicate to the data user that access to the particular leasable memory block was unsuccessful.

If the lease status 240 (FIG. 2) is a leased state, the identifier match is successful, and the lease has not expired, at Block 840 the memory controller 50 (FIG. 4) writes content (provided by the data user) to the particular leasable memory block. At Block 850, the memory controller 50 (FIG. 4) sets the access status register 57 (FIG. 4) to an access ok state to indicate to the data user that access to the particular leasable memory block was successful. At Block 860, the memory controller 50 (FIG. 4) sends the information of the access status register 57 (FIG. 4) to the data user.

Figure 9:
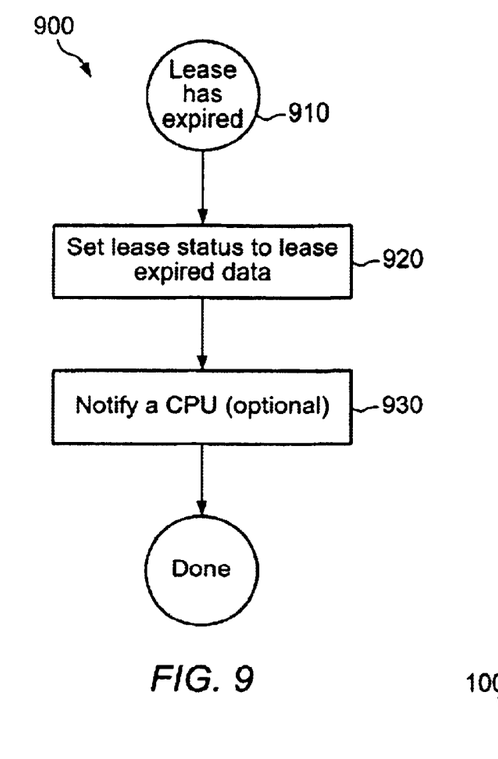
FIG. 9 illustrates a flow chart in the case of an expired lease in accordance with an embodiment of the present invention.

FIG. 9 illustrates a flow chart 900 of steps performed in the case of an expired lease in accordance with an embodiment of the present invention. At Block 910, the memory controller 50 (FIG. 4) has determined that the lease expiration data of a lease has elapsed. The memory controller 50 (FIG. 4) may use a polling method, an access-initiated method, or any other method to determine whether the lease expiration data of a lease has elapsed. Moreover, at Block 920, the memory controller 50 (FIG. 4) sets the lease status of the lease to a lease expired state. In addition, the memory controller 50 (FIG. 4) stores the updated lease information in the lease table. At Block 930, the memory controller 50 (FIG. 4) optionally notifies a component (e.g., a CPU) that a data user has involuntarily lost permission to access the content of the corresponding leasable memory block, possibly indicating the existence of an error or fault.

FIG. 10 illustrates a flow chart 1000 of steps performed for a lease_inquire command in accordance with an embodiment of the present invention. At Block 1010, the memory controller 50 (FIG. 4) receives a lease_inquire command from a data user. The data user indicates the particular leasable memory block whose corresponding lease the data user desires to investigate. Alternatively, the data user may provide the lease identifier 210 (FIG. 2) corresponding to the lease of the particular leasable memory block. At Block 1020, the memory controller 50 (FIG. 4) retrieves the lease information (e.g., a lease identifier 210 (FIG. 2), a lease owner identifier 220 (FIG. 2), lease expiration data 230 (FIG. 2), a lease status 240 (FIG. 2)) of the lease corresponding to the particular leasable memory block. Moreover, at Block 1030, the memory controller 50 (FIG. 4) sends the lease owner identifier, lease expiration data, and the lease status of the lease to the data user.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A memory system comprising:
   a memory including a plurality of leasable memory blocks for sharing among a plurality of software-based data users;
   a lease table comprising a plurality of leases each lease corresponding to a respective leasable memory block, wherein each lease comprises a plurality of lease information, and wherein said lease information comprises a pointer corresponding to said leasable memory block; and
   a hardware-based memory access mechanism separate from the plurality of data users for controlling and granting access to content of said leasable memory blocks based on said lease information of said lease table, wherein said hardware-based memory access mechanism is configured to expire a given one of said leases to prevent one of said software-based data users from permanently holding said given lease.

2. A memory system as recited in claim 1 wherein said lease information further comprises: a lease owner identifier; lease expiration data; and a lease status.

3. A memory system as recited in claim 2 wherein if said lease status of a particular leasable memory block is an unleased state, said memory access mechanism grants exclusive use of content of said particular leasable memory block to a data user by setting said lease status to a leased state, setting said lease owner identifier to an identifier of said data user, and setting said lease expiration data.

4. A memory system as recited in claim 2 wherein if said lease stats of a particular leasable memory block is a lease expired state, said memory access mechanism grants exclusive use of content of said particular leasable memory block to a data user by setting said lease status to a leased state, setting said lease owner identifier to an identifier of said date user, and setting said lease expiration data.

5. A memory system as recited in claim 2 wherein if said lease stats of a particular leasable memory block is a leased state and further if said lease expiration data has not expired, said memory access mechanism grants access to content of said particular leasable memory block to a data user having an identifier which matches said lease owner identifier of said particular leasable memory block.

6. A memory system as recited in claim 2 wherein if said lease stats of a particular leasable memory block is a leased state and further if said lease expiration data has not expired, said memory access mechanism enables release of exclusive use of content of said particular leasable memory block by setting said lease status to an unleased state in response to a request from a data user having an identifier which matches said lease owner identifier of said particular leasable memory block.

7. A memory system as recited in claim 2 wherein if said lease expiration data of a particular leas able memory block expires, said memory access mechanism sets said lease status to a lease expired state and denies access to content of said particular leasable memory block to a data user.

8. A memory system as recited in claim 2 wherein in response to a request from a data user, said memory access mechanism provides said lease information of a particular leasable memory block.

9. A memory system as recited in claim 1 wherein said memory access mechanism is a memory controller unit, and wherein said lease table is static.

10. A memory system as recited in claim 1 wherein said memory access mechanism is a memory controller unit, and wherein said lease table is dynamic.

11. A memory system comprising:
    a memory including a plurality of leasable memory blocks for sharing among a plurality of software-based data users;
    a lease table comprising a plurality of leases each lease corresponding to a respective leasable memory block, wherein each lease comprises a plurality of lease information, and wherein said lease information comprises a pointer corresponding to said leasable memory block; and a hardware-based memory controller unit separate from the plurality of data users for controlling and granting access to content of said leasable memory blocks based on said lease information of said lease table, wherein said hardware-based memory controller unit is configured to expire a given one of said leases to prevent one of said software-based data users from permanently holding said given lease.

12. A memory system as recited in claim 11 wherein said lease information further comprises: a lease owner identifier, lease expiration data, and a lease status.

13. A memory system as recited in claim 12 wherein if said lease status of a particular leasable memory block is an unleased state, said memory controller unit grants exclusive use of content of said particular leasable memory block to a data user by setting said lease status to a leased state, setting said lease owner identifier to an identifier of said data user, and setting said lease expiration data.

14. A memory system as recited in claim 12 wherein if said lease status of a particular leasable memory block is a lease expired state, said memory controller unit grants exclusive use of content of said particular leasable memory block to a data user by setting said lease status to a leased state, setting said lease owner identifier to an identifier of said data user, and setting said lease expiration data.

15. A memory system as recited in claim 12 wherein if said lease status of a particular leasable memory block is a leased state and if said lease expiration data has not expired, said memory controller unit grants access to content of said particular leasable memory block to a data user having an identifier which matches said lease owner identifier of said particular leasable memory block.

16. A memory system as recited in claim 12 wherein if said lease status of a particular leasable memory block is a leased state and if said lease expiration data has not expired, said memory controller unit enables release of exclusive use of content of said particular leasable memory block by setting said lease status to an unleased state in response to a request from a data user having an identifier which matches said lease owner identifier of said particular leasable memory block.

17. A memory system as recited in claim 12 wherein if said lease expiration data of a particular leasable memory block expires, said memory controller unit sets said lease status to a lease expired state and denies access to content of said particular leasable memory block to a data user.

18. A memory system as recited in claim 12 wherein in response to a request from a data user, said memory controller unit provides said lease information of a particular leasable memory block.

19. A memory system as recited in claim 11 wherein said lease table is static.

20. A memory system as recited in claim 11 wherein said lease table is dynamic.

21. A memory system as recited in claim 11 wherein said memory controller unit comprises:
   a control finite state machine;
   a comparator; and
   a plurality of registers.

22. A method of controlling access to a memory among a plurality of software-based data users, comprising:
   a) maintaining a lease table, wherein said memory comprises a plurality of leasable memory blocks, wherein said lease table comprises a plurality of leases each lease corresponding to a respective leasable memory block, wherein each lease comprises a plurality of lease information comprising a pointer corresponding to said leasable memory block; and
   b) controlling access to content of said leasable memory blocks based on said lease information of said lease table, wherein said controlling is performed in a hardware-based mechanism separate from and independently of said plurality of software-based data users, wherein said controlling comprises expiring a given one of said leases to prevent one of said software-based data users from permanently holding said given lease.

23. A method as recited in claim 22 wherein said lease information further comprises a lease owner identifier, lease expiration data, and a lease status.

24. A method as recited in claim 23 wherein said b) comprises:
   if said lease status of a particular leasable memory block is an unleased state, granting exclusive use of content of said particular leasable memory block to a data user by setting said lease status to a leased state, setting said lease owner identifier to an identifier of said data user, and setting said lease expiration data.

25. A method as recited in claim 23 wherein said b) comprises:
   if said lease status of a particular leasable memory block is a lease expired state, granting exclusive use of content of said particular leasable memory block to a data user by setting said lease status to a leased state, setting said lease owner identifier of said data user, and setting said lease expiration data.

26. A method as recited in claim 23 wherein said b) comprises:
   if said lease status of a particular leasable memory block is a leased stat and if said lease expiration data has not expired, granting access to content of said particular leasable memory block to a data user having an identifier which matches said lease owner identifier of said particular leasable memory block.

27. A method as recited in claim 23 wherein said b) comprises:
   if said lease status of a particular leasable memory block is a leased state and if said lease expiration data has not expired, enabling release of exclusive use of content of said particular leasable memory block by setting said lease status to an unleased state in response to a request from a data user having an identifier which matches said lease owner identifier of said particular leasable memory block.

28. A method as recited in claim 23 wherein said b) comprises:
   if said lease expiration data of a particular leasable memory block expires, setting said lease status to a lease expired state and denying access to content of said particular leasable memory block to a data user.

29. A method as recited in claim 23 further comprising:
   in response to a request from a data user, providing said lease information of a particular leasable memory block to said data user.

30. A method as recited in claim 22 wherein said lease table is static, and wherein said controlling is implemented in a memory controller unit.

31. A method as recited in claim 22 wherein said lease table is dynamic, and wherein said controlling is implemented in a memory controller unit.

* * * * *

UNITED STATES PATENT AND TRADEMARK OFFICE
CERTIFICATE OF CORRECTION

PATENT NO. : 6,862,666 B2
DATED : March 1, 2005
INVENTOR(S) : Chong et al.

It is certified that error appears in the above-identified patent and that said Letters Patent is hereby corrected as shown below:

Column 12,
Lines 24, 31 and 38, please delete "stats" and insert -- status -- in place thereof.
Line 47, please delete "leas able" and insert -- leasable -- in place thereof.

Signed and Sealed this

Twenty-fourth Day of May, 2005

JON W. DUDAS
*Director of the United States Patent and Trademark Office*